(12) United States Patent
Schäffer et al.

(10) Patent No.: US 8,332,960 B2
(45) Date of Patent: Dec. 11, 2012

(54) DEVICE FOR SCANNING A SAMPLE SURFACE COVERED WITH A LIQUID

(75) Inventors: Tilman Schäffer, Erlangen (DE); Matthias Böcker, Erlangen (DE); Boris Anczykowski, Münster (DE)

(73) Assignee: Westfalische Wilhems-Universitat Munster, Munster (DE)

( * ) Notice: Subject to any disclaimer, the term of this patent is extended or adjusted under 35 U.S.C. 154(b) by 270 days.

(21) Appl. No.: 12/441,267

(22) PCT Filed: Sep. 14, 2007

(86) PCT No.: PCT/EP2007/008036
§ 371 (c)(1),
(2), (4) Date: Mar. 16, 2011

(87) PCT Pub. No.: WO2008/031618
PCT Pub. Date: Mar. 20, 2008

(65) Prior Publication Data
US 2011/0162117 A1    Jun. 30, 2011

(30) Foreign Application Priority Data
Sep. 15, 2006  (DE) .......................... 10 2006 043 352

(51) Int. Cl.
*G01Q 60/18*  (2010.01)
(52) U.S. Cl. ................................. 850/30; 850/6; 850/32
(58) Field of Classification Search ................ 850/6, 12, 850/15, 22, 30, 32
See application file for complete search history.

(56) References Cited

U.S. PATENT DOCUMENTS

| 5,750,989 | A | | 5/1998 | Lindsay et al. |
| 5,763,767 | A | * | 6/1998 | Jung et al. ........................ 73/105 |
| 5,838,000 | A | * | 11/1998 | Mertesdorf et al. .......... 250/234 |
| 6,051,825 | A | | 4/2000 | Lindsay et al. |
| 6,127,681 | A | * | 10/2000 | Sato et al. ........................ 850/26 |
| 6,245,204 | B1 | * | 6/2001 | Lindsay et al. ................ 204/400 |
| 6,584,062 | B1 | * | 6/2003 | Naya ........................ 369/112.27 |
| 6,621,079 | B1 | * | 9/2003 | Shao et al. ...................... 250/306 |
| 6,694,817 | B2 | | 2/2004 | Degertekin et al. |
| 6,748,795 | B1 | * | 6/2004 | Jing ................................ 73/105 |

(Continued)

FOREIGN PATENT DOCUMENTS
EP         0 388 023        9/1990
(Continued)

OTHER PUBLICATIONS

International Preliminary Report on Patentability dated Apr. 16, 2009.

(Continued)

*Primary Examiner* — Robert Kim
*Assistant Examiner* — Jason McCormack
(74) *Attorney, Agent, or Firm* — RatnerPrestia

(57) ABSTRACT

A device for scanning the surface of a sample which is covered with a liquid, comprising a probe which has a tip at one end, means for moving the probe and the sample relative to one another a light source focussing device which focuses light from the light source onto a location in the area of the tip located in the liquid and a detector for detecting light which was scattered by the tip, wherein a boundary surface at which the light enters the liquid is located on the light path between the light source and the tip, wherein the boundary surface is positionally fixed with respect to the probe.

21 Claims, 9 Drawing Sheets

U.S. PATENT DOCUMENTS

| | | | |
|---|---|---|---|
| 7,067,806 B2 * | 6/2006 | Watanabe et al. | 250/306 |
| 7,305,869 B1 * | 12/2007 | Berman et al. | 73/105 |
| 7,571,638 B1 * | 8/2009 | Kley | 73/105 |
| 2002/0092982 A1 * | 7/2002 | Jhe et al. | 250/306 |
| 2003/0039429 A1 * | 2/2003 | Inoue et al. | 385/12 |
| 2003/0233870 A1 * | 12/2003 | Mancevski | 73/105 |
| 2004/0149021 A1 * | 8/2004 | Kessler et al. | 73/105 |
| 2004/0185586 A1 * | 9/2004 | Yasutake et al. | 438/14 |
| 2005/0151077 A1 * | 7/2005 | Watanabe et al. | 250/310 |

FOREIGN PATENT DOCUMENTS

| | | |
|---|---|---|
| EP | 0 564 088 | 10/1993 |
| EP | 0 565 227 | 10/1993 |
| EP | 0 701 102 | 3/1996 |
| EP | 0 822 435 | 2/1998 |
| JP | 5-232081 | 9/1993 |
| WO | WO 02/084210 | 10/2002 |
| WO | WO 03/019108 | 3/2003 |

OTHER PUBLICATIONS

Müller et al., Electrochemical Pattern Formation in a Scanning Near-Field Optical Microscope, Appl. Phys. A 66.5453 (1998).

Böcker et al, "Scanning Ion Conductance Microscopy With Distance-Modulated Shear Force Control", Nanotechnology 18 (Apr. 11, 2007) (6pp).

Böcker et al., "ScanningIon Conductance Microscopy. Imaging Technique Integrating Shear Force Distance Control", Imaging and Microscopy, Feb. 2002 (3 pp).

Haefliger et al., An Integrated Piezo-Acoustic Shear-Force Distance Sensor With Nanometer Resolution for a Micropipette Tool, Sensors and Actuators A 103 (2003) pp. 353-358.

Mannelquist et al., "Near-Field Optical Microscopy With a Vibrating Probe in Aqueous Solution", Applied Physics Letters, vol. 78, No. 14, Apr. 2, 2001, pp. 2076-2078.

International Search Report dated Feb. 28, 2008.

* cited by examiner

Section A - A'

DEVICE FOR SCANNING A SAMPLE SURFACE COVERED WITH A LIQUID

BACKGROUND OF THE INVENTION

1. Field of the Invention

The present invention relates to a device for scanning the surface of a sample covered with a liquid. Such devices are disclosed, for example, in Lambelet, P., M. Pfeffer, A. Sayah and F. Marquis-Weible (1998), "Reduction of tip-sample interaction forces for scanning near-field optical microscopy in a liquid environment". Ultramicroscopy 71(1-4): 117-121; Nitz, H., J. Kamp and H. Fuchs (1998). "A combined scanning ion-conductance and shear-force microscope". Probe Microsc. 1: 187-200; and Schäffer, T. E., B. Anczykowski and H. Fuchs (2006), Scanning Ion Conductance Microscopy, Applied Scanning Probe Methods, B. Bhushan and H. Fuchs. Berlin, Heidelberg, N.Y., Springer Verlag. 2: 91-119.

2. Description of the Background Art

A known device 10 according to the preamble of claim 1 is shown schematically in FIG. 1. The device comprises a probe which is formed by a pipette 12 which tapers to a fine tip 14 at its lower end in the diagram in FIG. 1. The pipette 12 is furthermore in contact with a piezo-element 16 by which the tip 14 of the pipette 12 can be set in vibration by.

FIG. 1 also shows a sample container 18 in which a sample 20 shown schematically is located. The sample container 18 is filled with a liquid 22 which completely covers the sample 20. The sample 20 could, for example, comprise living cells which can only exist in liquid. Another reason for covering the sample 20 with a liquid, more accurately with an electrolyte, resides in the possibility of carrying out ion conductivity measurements which will be described in detail below.

The sample container 18 is located on an XYZ scanner 24 so that the sample container with the sample 20 can be moved relative to the pipette 12. Due to the relative movement, the surface of the sample 20 can be scanned with the tip 14 of the pipette 12.

The device 10 from FIG. 1 further comprises a laser 26 whose beam 28 is focussed onto the tip 14 in the quiescent state by a focussing device not shown. The laser 26 and the pipette 12 are positionally fixed with respect to one another, for example, by mounting both on the same experimental table. Thus, the distance between the laser 26 and the tip 14 of the pipette 12 does not change during scanning so that the laser beam should always be focussed onto this tip during the relative movement between the sample and the pipette tip 14.

Finally, there is provided a detector 30 which receives the laser beam 28 after this has been reflected at the tip 14. The reflected laser light 28 is modulated by the vibration of the tip 14 produced by the piezo-element 16. By means of these modulations, the vibrations of the pipette tip 14 can be detected with the aid of the detector 30. In the present document, the interaction of the laser beam with the tip 14 is generally designated as "scattering". The term "scattering" in particular embraces reflection from the tip and transmission which is obtained, for example, when the tip vibrates out from the light path of the laser beam.

When the pipette tip 14 is brought very close to the surface of the sample 20, shear forces occur which influence, for example, damp, the amplitude, phase and/or frequency of the vibration of the tip 14. The damping of the vibration is in turn detected with the aid of the detector 30. As a result, the distance between the tip 14 and the sample 20 can be determined. For example, the XYZ scanner 24 can be driven in such a manner that the damping of the oscillation and therefore the distance between the tip 14 and the sample can be kept constant when scanning the sample 20. The movements of the XYZ scanner carried out when scanning the surface of the sample 20 can be recorded by a computer (not shown) and a topographical picture of the surface can be generated from these. The device of FIG. 1 is therefore designated as a shear force microscope.

However, in the known device of FIG. 1, problems with the reliability of the signals frequently arise. It appears to be difficult to keep the laser beam 28 focussed on the tip 14 of the pipette when this is surrounded by the liquid 22. In order to avoid these problems, attempts have been made to keep the level of the liquid 22 sufficiently low that an upper section of the tip 14 projects above the liquid level and to focus the laser beam 28 onto this upper section without it needing to pass through the liquid. However, this has proved to be difficult in practice since a sufficiently low liquid level above the sample can only be produced with difficulty and can be maintained only with difficulty during the investigation because a part of the liquid is continuously evaporating. Even if the sample can be kept continuously covered with liquid, the following problems arise: if the liquid level is kept low and is thereby present on a section on which the tip vibrates with comparatively large amplitude, the optical signals obtained are perceptibly modified by small changes in the liquid level as a result of evaporation and thereby falsified. If a higher liquid level is used, which is present on a section of the tip on which the tip vibrates only with comparatively low amplitude, the signals are certainly more stable but in return significantly weaker.

In order to avoid these problems a "diving bell" structure is used in Koopman, M., B. I. de Bakker, M. F. Garcia-Parajo and N. F. van Hulst (2003) "Shear force imaging of soft samples in liquid using a diving bell concept". Appl. Phys. Lett. 83(24): 5083-85 but this is comparatively complex.

It is the object of the present invention to improve a device of the type specified above in such a manner that it allows reliable focussing of the light onto the tip of the probe.

This object is achieved in the device of the type specified above whereby a boundary surface at which the light enters the liquid is located on the path of the light between the light source and the tip of the probe, wherein the boundary surface is positionally fixed with respect to the probe.

SUMMARY OF THE INVENTION

The invention is based on the finding that in the known device from FIG. 1, the optical path length between the laser 26 (or a focussing device not shown) on the one hand and the tip 14 of the pipette 12 on the other hand changes when the sample container 18 is moved relative to the pipette 12 and the laser 26 when scanning the sample 20. This is because although the distance between the laser 26 and the pipette 12 remains unchanged during this relative movement, the fractions of the path covered by the laser beam 28 in air or in the optically denser liquid 22 change. Thus, the optical path length between the focussing device (not shown) and the pipette tip 14 varies during scanning and due to this variation in the optical path length, the focussing at the pipette tip 14 can be lost.

In the device according to the invention, however, a boundary surface at which the light enters the liquid is located on the path of the light between the light source and the tip of a boundary surface and this boundary surface is located positionally fixed with respect to the probe. This means that the path length of the light through the optically denser liquid does not vary during scanning and as a result, the focussing can be retained. In contrast to this, in the prior art of FIG. 1, the said boundary surface is formed by the wall of the sample container 18 and is moved relative to the probe 12 during scanning of the sample 20, and is therefore not positionally fixed with respect to the probe.

For improving the quality of the optical signal, the detector and the probe are preferably positionally fixed relative to one another. In order to keep the optical path length between the tip and the detector constant during the scanning process, in an advantageous further development the device has a further boundary surface at which the light emerges from the liquid located on the path of the light between the tip and the detector, this boundary surface also being positionally fixed with respect to the probe.

First deflecting means such as, for example, mirrors or deflecting prisms, are preferably provided to deflect light on the path from the light source in the direction of the probe tip. In addition, preferably second deflecting means and/or a collimator device are provided which deflect light scattered by the tip onto the detector. With the aid of the deflecting means, the optical path between the light source, the tip and the detector can be set up according to the desired geometry of the structure. Advantageously the collimator device is also positionally fixed relative to the probe.

In a particularly advantageous further development of the invention, there is provided a light-guiding device which is positionally fixed with respect to the probe, and which can be immersed at least partially into the liquid and which has an interior which is separated from the liquid by the boundary surface between the light source and the tip and/or the boundary surface between the tip and the detector. Such a light-guiding device can be fastened in a simple manner together with the probe on a common holder so that the positionally fixed relationship between the boundary surface and the probe can be simply produced, as is explained in detail hereinbelow with reference to exemplary embodiments.

Light-guiding devices for scanning probe microscopes are known per se from DE 195 46 860 C2 but these are not disclosed in connection with samples covered with a liquid and they therefore also have no boundary surface at which the light enters into the liquid or emerges from the liquid.

In an advantageous embodiment, such a light-guiding device is provided for the light path between the light source and the probe tip and a further light-guiding device is provided for the light path between the probe tip and the detector. Two detectors can also be provided, each having a light-guiding device of which one is arranged so that it collects light transmitted by the vibrating tip and the other collects light reflected by the tip.

In an advantageous further development, the device comprises a probe holder in which the probe is detachably fastened by a resilient element which presses the probe against supports of the probe holder. The probe holder thus allows rapid and reliable exchange of the probe. This is advantageous because the probes wear relatively rapidly and must frequently be replaced. In addition, the stability of the probe can be increased by the probe holder. The probe holder preferably has at least two and in particular four individual supports each having a convex, in particular hemispherical support surface. The hemispherical support surfaces allow a precisely defined and reproducible position of the probe in the probe holder so that the alignment is significantly simplified after changing the probe.

In a particularly advantageous further development of the invention, the probe holder for its part is detachably held on a retaining device. The retaining device preferably comprises a retaining plate and an adjusting device, wherein the probe holder is adjustable relative to the retaining plate by means of the adjusting device. The modular structure of probe holder and retaining device make it easier to change the probe because this can be removed from the apparatus together with the probe holder and changing the probe on the probe holder alone, i.e. outside the apparatus is significantly more convenient than if the probe holder remains in the apparatus.

In a particularly advantageous further development of the invention, the device can be extended by the function of a scanning ion conductance microscope, SICM. For this purpose, the probe is formed by a pipette which has the elongate tip at one end, in which an opening is located, via which an interior cavity of the pipette communicates with the external surroundings of the tip. In addition, respectively one electrode is located in the liquid covering the sample and in the cavity of the pipette. In this further development, an electrolyte is additionally used for the liquid. When a voltage is applied between the two electrodes, a measurable ion current flows through the opening on the tip. However, if the tip is moved sufficiently close to the sample, the ion current is "pinched off" which can be detected by a decay of the ion current. According to this further development, the device thus acquires a dual functionality for detecting the distance from a sample, namely on the one hand by the shear force and on the other hand by the ion conductivity. Alternatively, the device according to the invention can also be combined with a functionality of a spatially resolving near-field microscopy ("near-field scanning optical microscopy", NSOM) in which the probe is not formed by a pipette but by a glass fibre drawn at its one end to form an elongate tip and an aperture is provided at the tip by which means an optical near field can be produced or detected by means of the sample.

BRIEF DESCRIPTION OF THE DRAWINGS

Further advantages, properties and features of the invention are obtained from the following description in which the invention is described in detail by means of exemplary embodiments with reference to the appended drawings. In the figures.

DETAILED DESCRIPTION OF THE PREFERRED EMBODIMENTS

Figure 1:
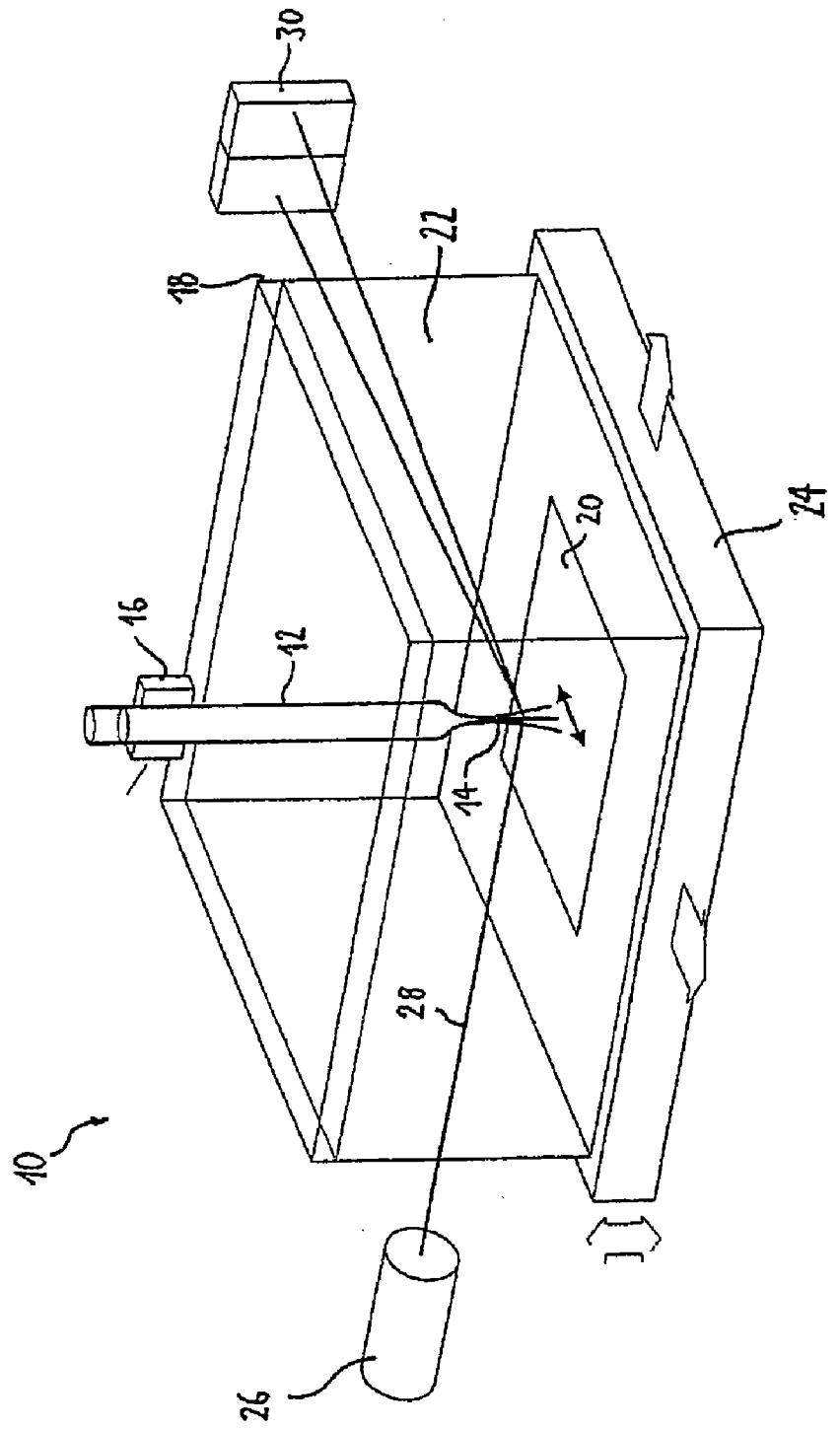
FIG. 1 shows a perspective view of a device for scanning the surface of a sample from the prior art.
Figure 2:
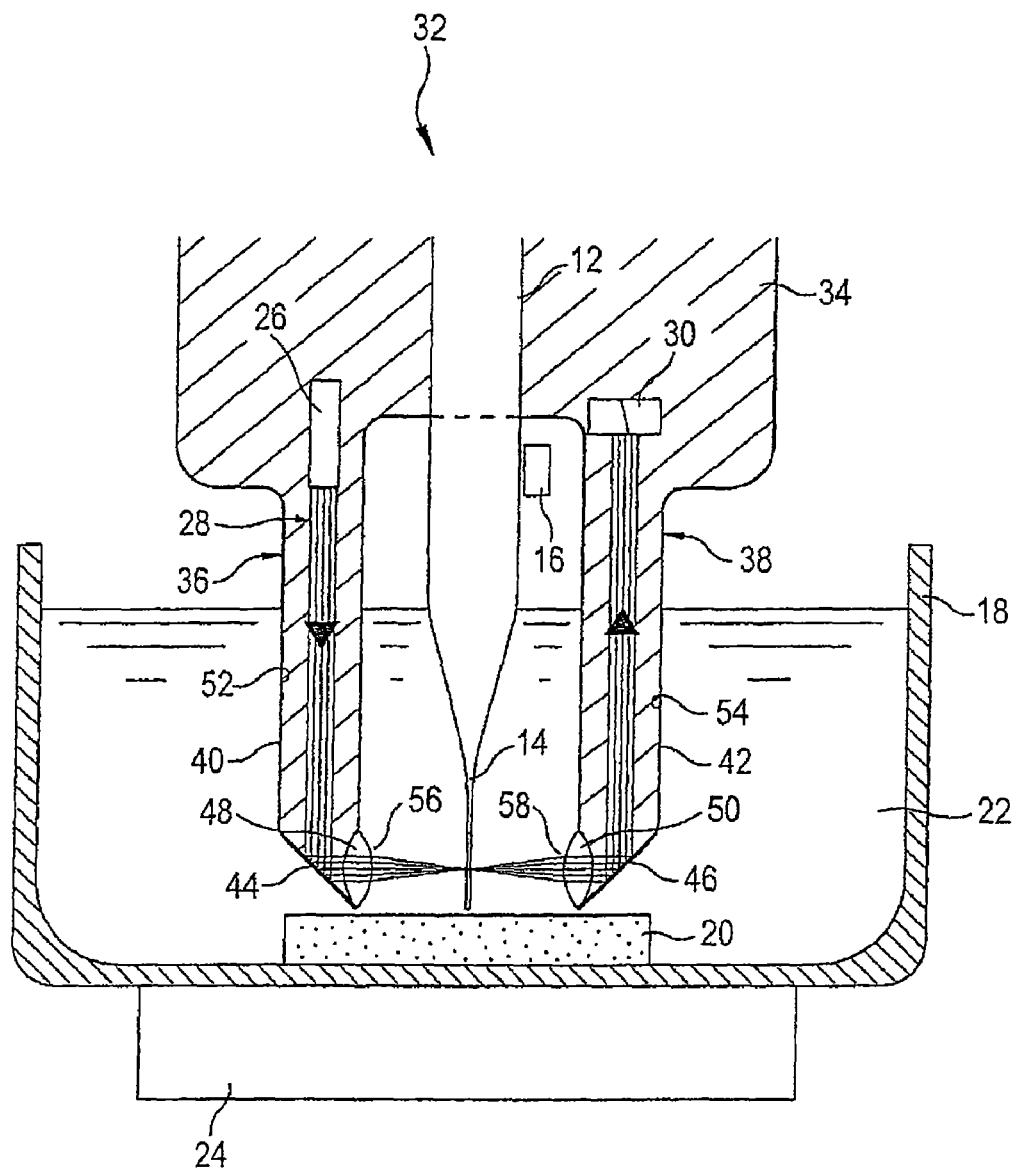
FIG. 2 shows a cross-sectional view of a device for scanning the surface of a sample according to a further development of the invention.

FIG. 2 shows a device 32 for scanning the surface of a sample covered with a liquid 22. In all the drawings components which are identical or correspond to one another are designated with the same reference numerals. The device 32 comprises a probe which in the exemplary embodiment shown is formed by a pipette 12 with an elongate tip 14. Similarly to the prior art from FIG. 1, the sample 20 is located in a sample container 18 which is located on an XYZ scanner 24 and can thus be moved relative to the probe 12.

The device 32 further comprises a schematically depicted supporting retaining device 34 to which the probe 12, a first light-guiding device 36 and a second light-guiding device 38 are fastened. A laser 26 and a detector 30 are further disposed on the supporting retaining device 34. The first and the second light-guiding device 36, 38 each comprise a tubular section 40 or 42 which is immersed into the liquid 22. Located at the lower end of each tubular section is a mirror 44 or 46 and a convex lens 48 or 50, respectively. The light-guiding devices 36 and 38 each have an interior 52, 54 respectively which is separated from the liquid 22.

The function of the device from FIG. 2 is described hereinafter. The laser 26 sends a laser beam 28 through the interior 52 of the first light-guiding device 36 which is deflected at the mirror 44 and focussed by the lens 48 onto the tip 14 of the probe 12. In this case, the lens 48 forms both a focussing device and also the boundary surface 56 at which the light 28 enters the liquid 22.

The tip 14 of the probe 12 is set in vibration by a piezo-crystal 16 so that the tip 14 vibrates transversely and thereby modulates the light signal. The light signal 28 modulated by the tip 14 emerges from the liquid 22 at the collimator lens 50 of the second light-guiding device 38 and is collimated, deflected by the mirror 46 and directed onto the detector 30 at which it is detected. The piezo-crystal 16 is not essential in all cases, for example, the thermal movement of the tip 14 could be sufficient for a measurable modulation of the light signal.

As can be seen from the drawing, the light guiding devices 36 and 38 have a periscope-like structure and these light-guiding devices or periscopes are positionally fixed with respect to the probe 12 since they are fastened to the same supporting retaining device 34. This means in particular that the boundary surface 56 at which the light 28 enters the liquid 22 and which, in the exemplary embodiment shown, is formed by the surface of the lens 48 facing the tip 14, is positionally fixed relative to the probe 12. Thus, not only the geometrical path length of the light between the laser 26 and the tip 14 is kept constant but also the optical path length because the distance between the boundary surface 56 and the sample 14 and therefore the fraction of the light path in the optically denser medium does not vary during the scanning. Unlike in the prior art from FIG. 1, it is thereby achieved that the focussing of the laser light 28 to the tip 14 remains uninfluenced by the scanning movement of the XYZ scanner 24.

Similarly, a boundary surface 58 at which the light 28 emerges from the liquid 22 is formed by the surface of the lens 50 facing the tip 14 and this is also positionally fixed with respect to the probe 12.

Figure 3:
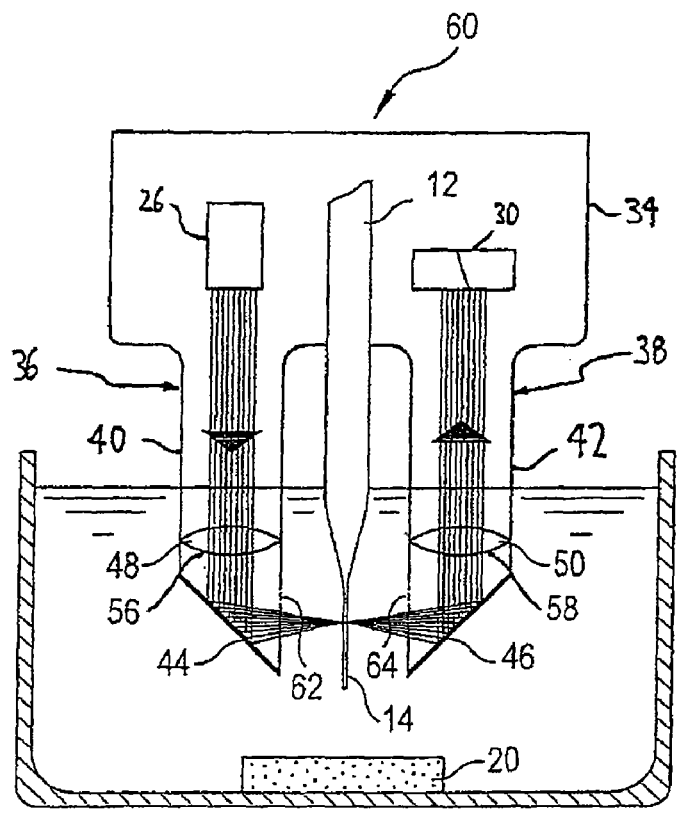
FIG. 3 shows a device as in FIG. 2 but with an exchanged arrangement of lenses and mirrors.

FIG. 3 shows another embodiment 60 which is very similar to the device 32 from FIG. 2. The difference between the devices 32 and 60 consists in that the sequence of the lenses 48, 50 and the mirrors 44, 46 is exchanged. In the device 60 of FIG. 3, there is located in the lower section of the tubular sections 40 or 42 respectively one opening 62, 64 through which liquid 22 can enter into the tubular sections 40, 42 and can penetrate in these as far as the respective lenses 48, 50 which, as in FIG. 2, form the respective boundary surfaces 56 or 58. Alternatively however, the openings 62 and 64 could also be closed with a translucent material, e.g. a glass wafer which would then for its part form the boundary surfaces.

The devices with the periscope-like light-guiding devices 36 and shown in FIGS. 2 and 3 are extremely compact. In fact, instead of moving the sample container 18 with an XYZ scanner 24, the compact structure allows the entire retaining device 34, including probe 12, laser 26, detector 30 and light-guiding devices 36 and 38 to be moved with an XYZ scanner (not shown) with respect to the container 18 which could then be arranged in a positionally fixed manner with respect to the experimental table. This is particularly advantageous in the case of samples which cannot be moved easily, for example, samples which must be held at a certain temperature and therefore need to be disposed on a heating device or if the samples are particularly large and therefore difficult to move.

Figure 4:
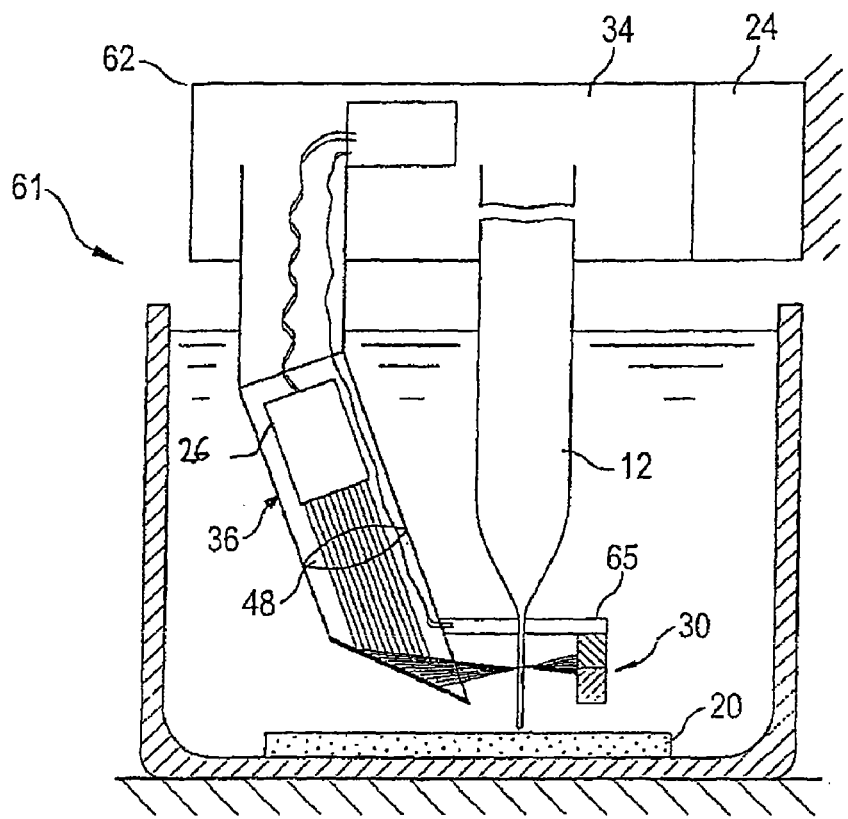
FIG. 4 shows a cross-sectional view of a device according to an alternative further development of the invention without imaging optics between tip and detector.

FIG. 4 shows a device 61 in which the retaining device 34 can be adjusted by means of an XYZ scanner 24. The device 61 comprises a first light-guiding device 36 which is similar to that of FIG. 3 except that it is inclined by about 10 to 20 degrees with respect to the longitudinal axis of the probe 12. Unlike the devices 32 and 60 from FIGS. 2 and 3, the device 61 however does not comprise any second light-guiding device 38. Instead, the detector 30 is rigidly connected to the light-guiding device 36 by means of a supporting element 65 and is disposed in the immediate vicinity of the tip 14 in the light path of the laser beam 28. This simplification is possible because the requirements for the accuracy of the imaging of the laser light on the detector 30 are less stringent with regard to the quality of the measurement than those on the focussing of the laser light 28 on the tip 14.

Figure 5:
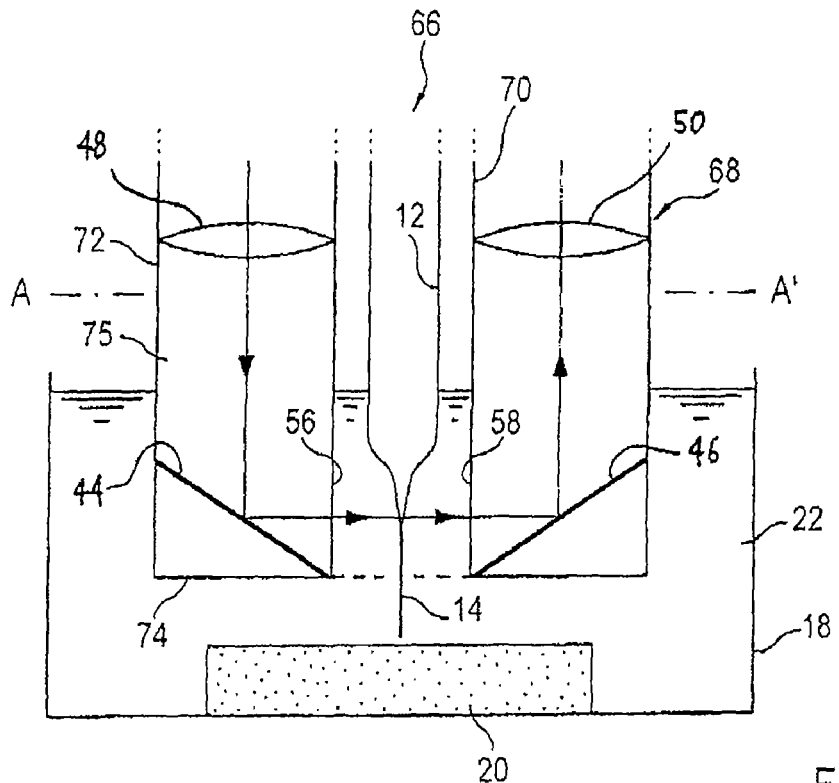
FIG. 5 shows a cross-sectional view of a device according to an alternative further development of the invention in which the boundary surface between the light source and the tip and the boundary surface between the tip and the detector are formed by the inner wall of an annular cylinder.
Figure 5A:
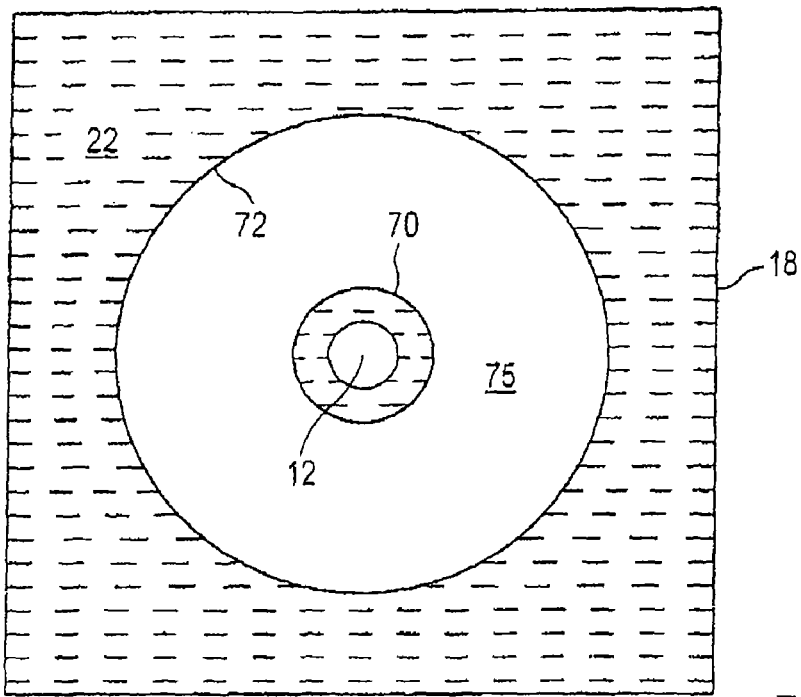
FIG. 5a shows a plan view of the device from FIG. 5, FIGS. 6a and 6b show schematically the possibilities for detecting the vibration of the tip with laser light.

FIGS. 5 and 5a show another embodiment 66 according to a further development of the invention. FIG. 5 shows a longitudinal section through the device 66 and FIG. 5a shows a cross-section along the line A-A'.

The device 66 is similar in its function to the device 60 of FIG. 3. The main difference is that instead of the two separate periscope-like devices 36 and 38, only one light-guiding device is provided in the device 66. The light-guiding device 68 consists of an annular cylinder or double cylinder with an inner cylinder 70 which directly surrounds the probe 12 and an outer cylinder 72. The inner cylinder 70 and the outer cylinder 72 are connected by an annular base surface 74 so that an interior 75 separated from the liquid 22 is obtained. As in the device 60 of FIG. 3, lenses 48, 50 and mirrors 44, 46 are disposed in the interior 75. In the device 66 the boundary surfaces 56 or 58 at which the laser light 28 enters into or emerges from the liquid 22 are formed by transparent sections in the inner cylinder 70. The entire light-guiding device 68 is positionally fixed relative to the probe 12, for example, by again fastening both to a common retaining device (not shown). The invention is therefore not restricted to a device having periscope-like light-guiding devices but a plurality of designs are possible as long as at least the boundary surface at which the light enters the liquid 22 is positionally fixed with respect to the probe 12.

Figures 6A, 6B:
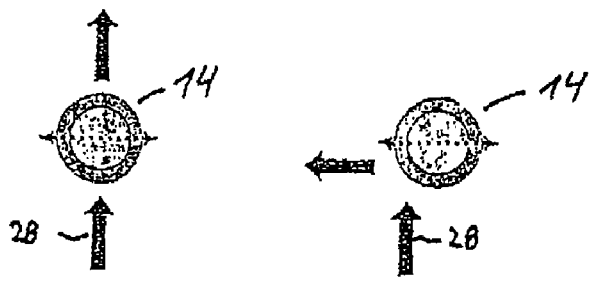

FIGS. 6a and 6b shows two fundamental optical detection modes of the vibration of the tip 14. The transverse direction of vibration of the tip 14 is indicated schematically by the dashed arrow. The light beam 28 is guided and focussed onto a location of the tip 14 in the vibration-free state as was described above with reference to FIGS. 2 to 5. According to a first detection mode, the light which is transmitted due to the vibration of the tip 14 can be detected. The transmitted light is differently modulated depending on the vibration state of the tip 14. This case is shown schematically in FIG. 6a. Alternatively, the light reflected by the tip 14 can be detected, as shown schematically in FIG. 6b. In this case, at least the part of the tip 14 onto which the light is focussed, is vapour-coated with a metal to produce a reflecting surface.

Figure 7A:
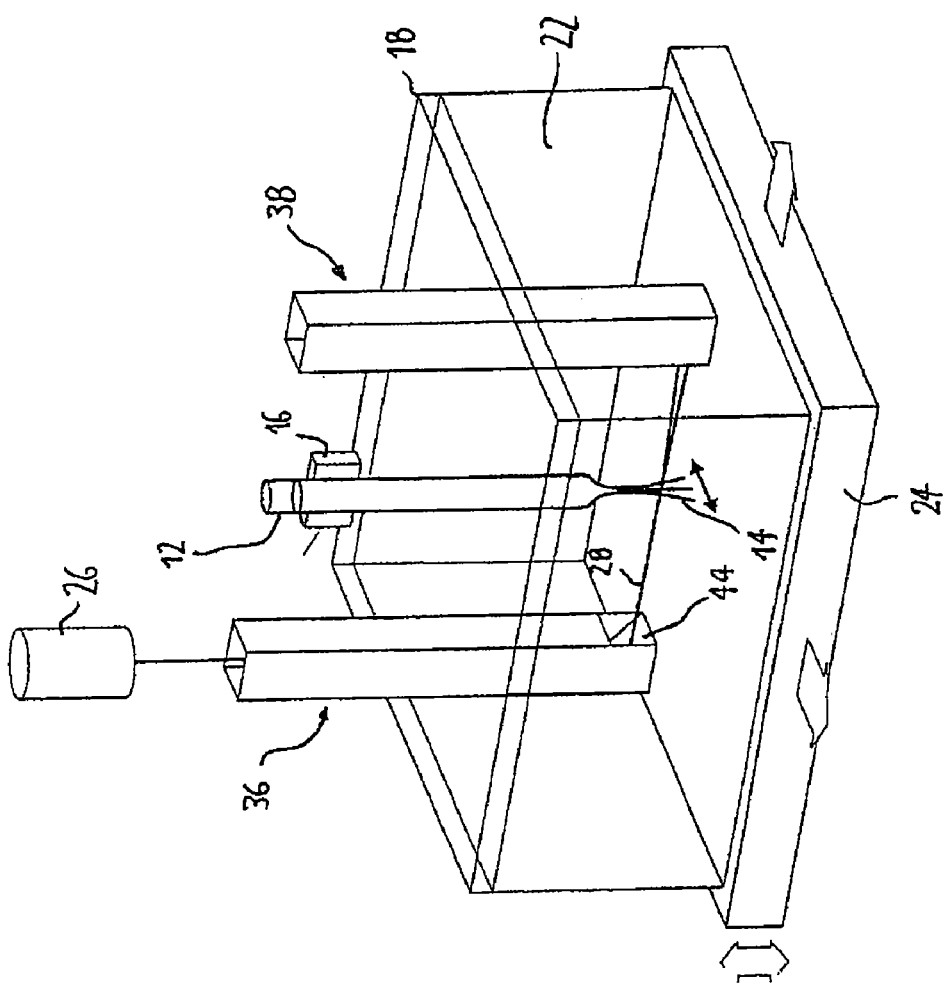
FIG. 7a shows a perspective view of a device for detection in transmission according to FIG. 6a, FIG. 7b shows a perspective view of a device for detection in reflection according to FIG. 6b.
Figure 7B:
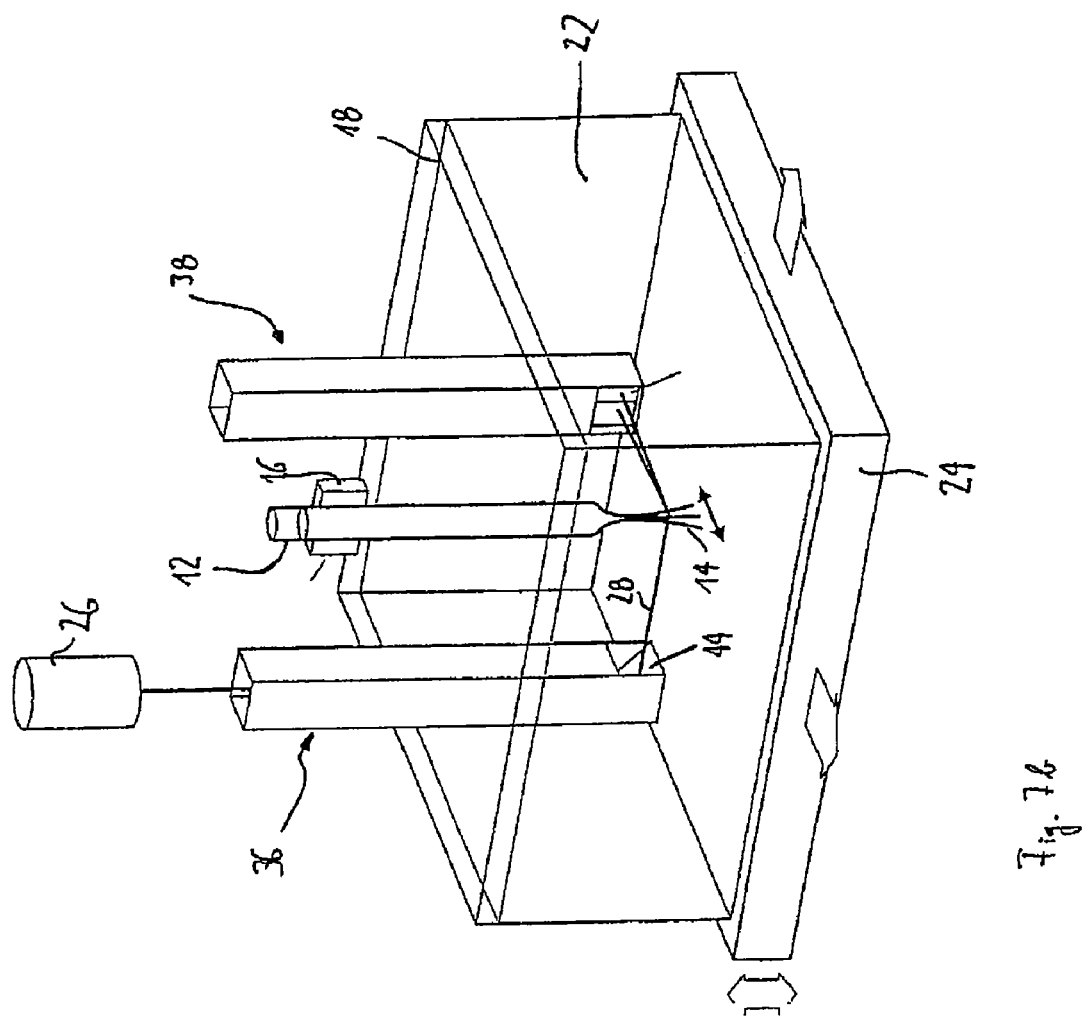

FIGS. 7a and 7b show in three-dimensional view corresponding structures to the detection modes shown in FIGS. 6a and 6b. In the embodiment of FIG. 7a, a first and a second periscope-like light-guiding device 36, 38 are used, similar to those of the device 32 from FIG. 2. The laser beam 28 is directed and focussed by the first light-guiding device 36 onto a location on the tip 14 of the probe 12, similarly to that described in connection with FIGS. 2 and 3. The transmitted light beam 28 modulated by the vibration of the tip 14 is collected by the second light-guiding device 38 and imaged on a detector (not shown in FIG. 7a). Although this is not shown in FIG. 7a, the first light-guiding device 36, the second light-guiding device 38 and the probe 12 are fastened to a common retaining device and therefore positionally fixed with respect to one another, FIG. 7b shows the corresponding structure for the case where the laser light 28 is reflected at the tip 14.

In FIGS. 7a and 7b the liquid 22 is an electrolyte. An opening is formed in the tip 14 of the pipette 12 via which the interior of the pipette 12 communicates with the external surroundings, i.e. the electrolyte 22 in the sample container 18. Respectively one electrode (not shown in the figures) can be disposed in the sample container 18 and the interior of the pipette 12, between which a voltage can be applied. As a result of the voltage, an ion current flows through the opening in the tip 14 of the pipette 12 which can be measured to carry out distance measurements by the SICM method.

Figure 8:
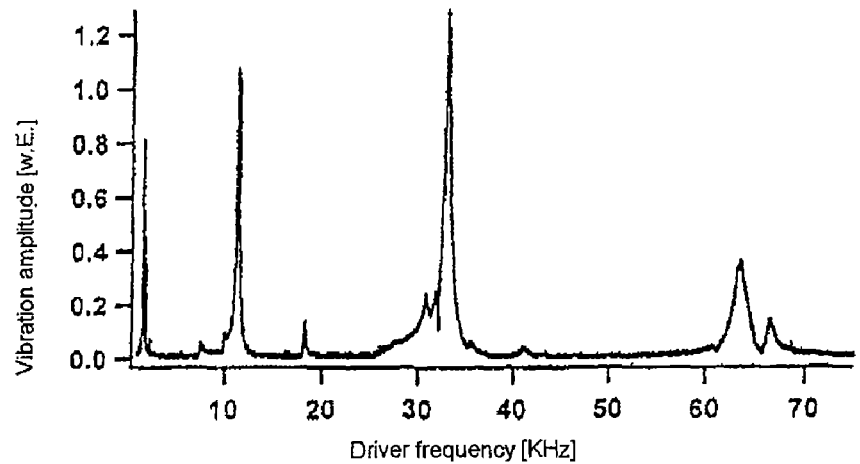
FIG. 8 shows the resonance spectrum of the vibration of the tip of a pipette.

FIG. 8 shows a measurement curve of the oscillation amplitude of the tip 14 excited to transverse vibrations by the piezoelectric element 16 as a function of the driver frequency of the piezoelectric element 16. As can be seen in FIG. 8, there are clearly defined resonance frequencies. The piezo-electric element 16 is driven at one or more of these resonance frequencies during operation of the device.

Figure 9:
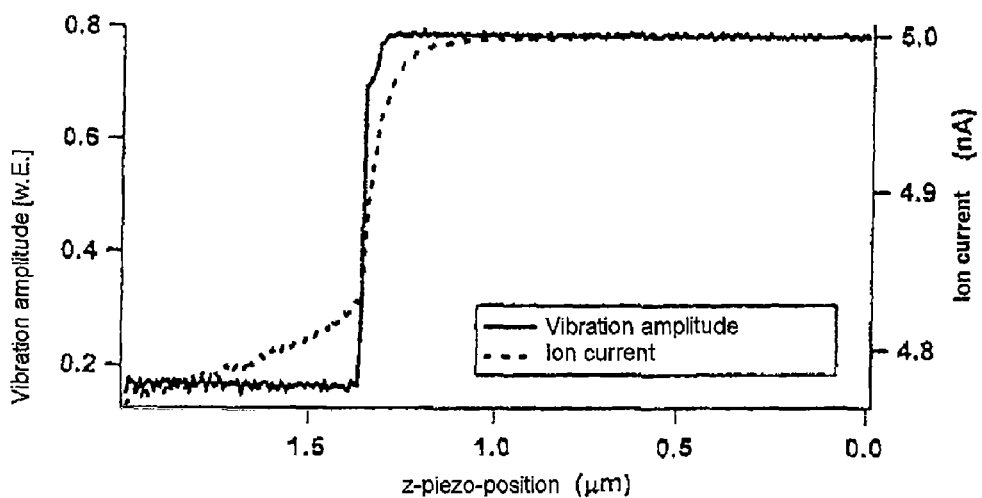
FIG. 9 shows a diagram of the vibration amplitude and the ion current through an opening in the tip of the pipette as a function of the distance between the sample surface and the tip.

FIG. 9 shows the dependence of the vibration amplitude of the tip 14 on the left-hand ordinate as a function of the z-position of the XYZ scanner 24 and therefore the distance between the tip 14 and the surface of the sample 20. As the sample 20 approaches the tip 14 (i.e. looking from right to left on the abscissa), a clear jump is identified at a position of about 1.4 μm in the oscillation amplitude of the tip 14. This effect corresponds to the damping described above which is effected by shear forces when the tip 14 comes very close to the sample surface. The ion current is further plotted on the right-hand ordinate which, as described above, flows through the opening in the tip 14 of the pipette 12. As can be identified in FIG. 9, the ion current also drops approximately at the same distance at which the oscillation damping due to the shear forces commences because it is pinched off in very close proximity to the sample surface.

Figure 10:
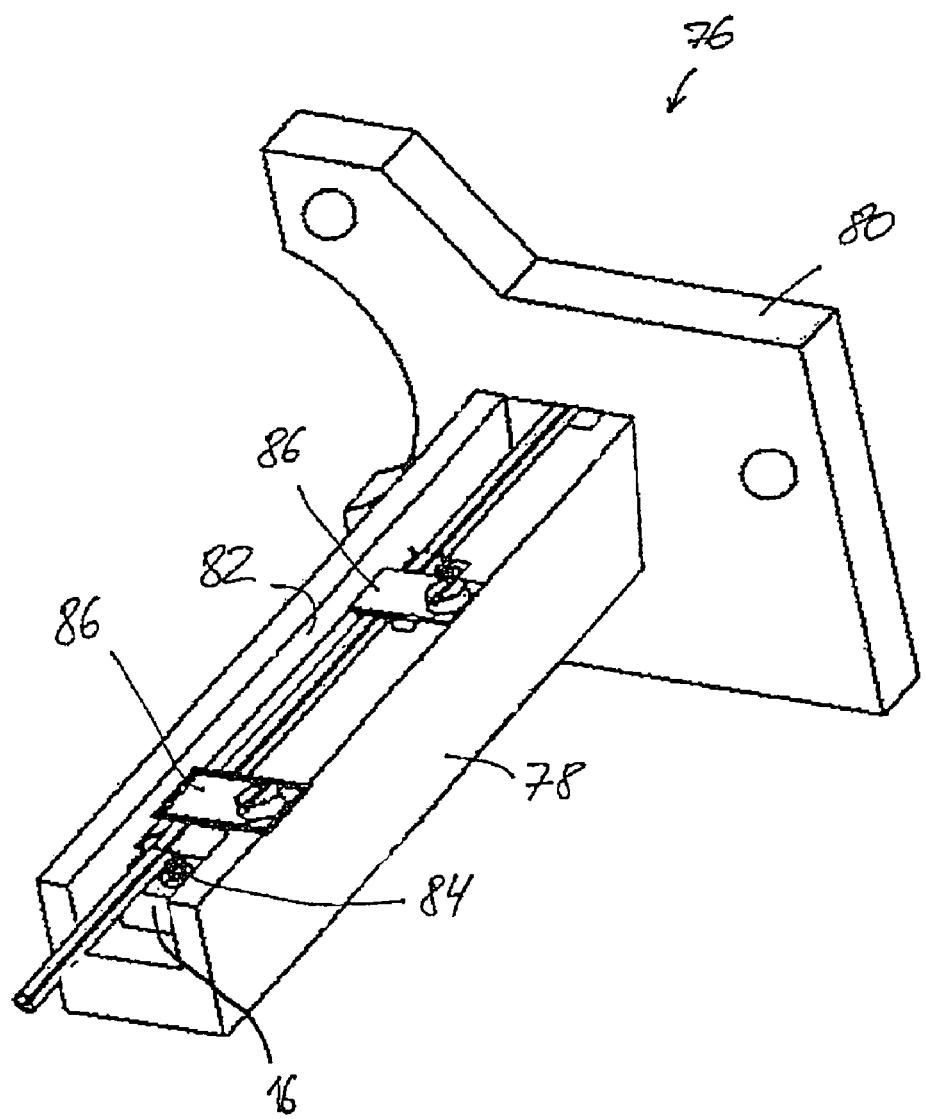
FIG. 10 shows a perspective view of a probe holder with a pipette fastened therein and FIG. 11 shows a retaining device comprising retaining plate, adjusting device and probe holder.

FIG. 10 shows a probe holder 76 in perspective view. The probe holder 76 has an elongate retaining section 78 which defines a longitudinal axis and a flange section 80 disposed at right angles thereto. A longitudinal groove 82 is formed in the retaining section 78, two pairs of hemispherical supports 84 being formed on the bottom thereof (covered in the diagram). Furthermore, two leaf springs 86 are fastened to the retaining section 78 by which means the probe 12 is pressed against the supports 84 so that the probe 12 is held in a predetermined and reproducible position. The groove 82 in the retaining section 78 is in this case continued through the flange section 80 as far as an opening on the side of the flange section 80 opposite to the retaining section 78 so that the probe 12 can be inserted through this opening into the groove 82.

Figure 11:
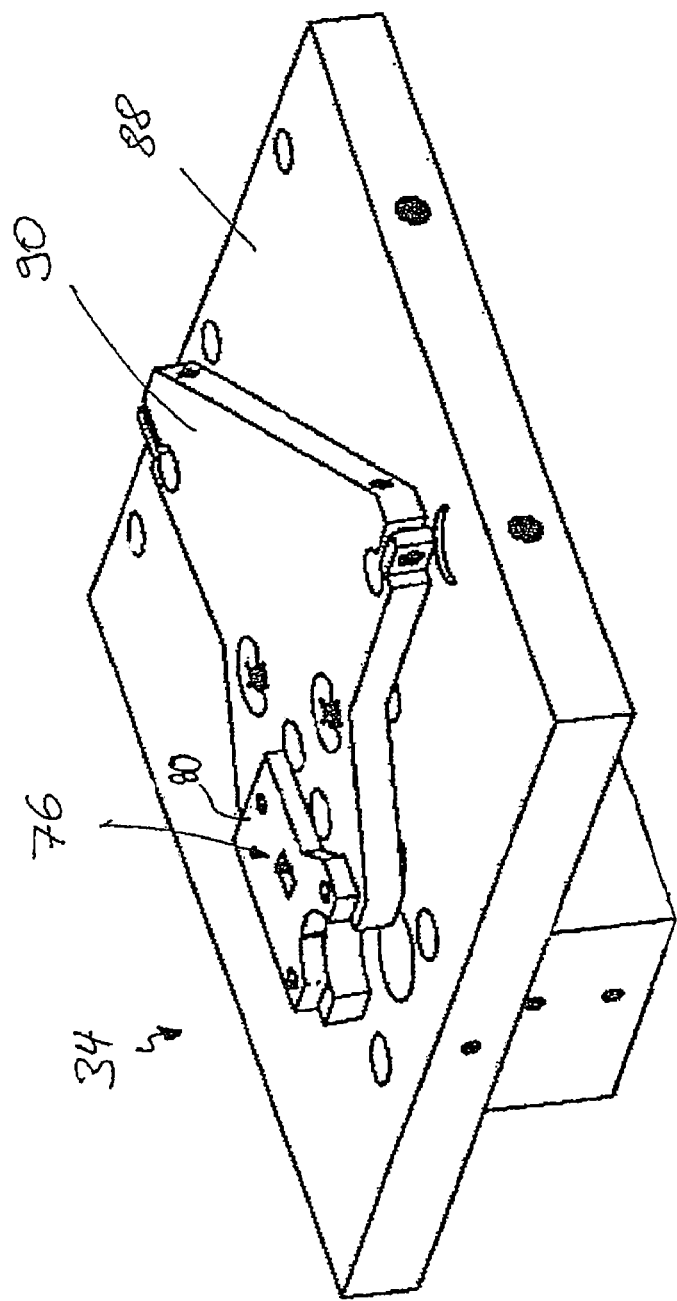

FIG. 11 shows a retaining device 34 in perspective view. The retaining device 34 comprises a retaining plate 88 on which an adjusting table 90 is adjustably fastened. The adjusting device 90 comprises a usual XY adjusting device or tilting device which can be positioned relative to the retaining plate 88 by means of suitable adjusting screws (not shown). The retaining section 78 of the probe holder 76 is inserted in a recess in the adjusting table 90, whereby the flange section 80 rests on the adjusting table 90. For changing the probe, the probe holder 76 as a whole can be pulled from the opening in the adjusting table 90 and thus removed from the device. The probe 12 in the probe holder 76 can then be exchanged outside the device and the probe holder with the new probe can be inserted into the opening in the adjusting table 90. This modular structure significantly simplifies exchanging the probe 12.

The features disclosed in the preceding description, the claims and the drawings can be important both individually and in any combination for executing the invention in its various embodiments.

REFERENCE LIST

10 Device for scanning the surface of a sample according to the prior art
12 Probe
14 Tip of the probe 12
16 Piezo-element
18 Sample container
20 Sample
22 Liquid
24 XYZ scanner
26 Laser
28 Laser beam
30 Detector
32 Device for scanning the surface of a sample
34 Retaining device
36 First light-guiding device
38 Second light-guiding device
40, 42 Tubular section
44, 46 Mirrors
48, 50 Lens
52, 54 Interior of the light-guiding device 36, 38
56, 58 Boundary surface
60, 61 Device for scanning the surface of a sample
62, 64 Opening
65 Supporting element
66 Device for scanning the surface of a sample
68 Light-guiding device
70 Inner cylinder
72 Outer cylinder
74 Base
75 Interior
76 Probe holder
78 Retaining section
80 Flange section
82 Longitudinal groove
84 Support
86 Leaf spring
88 Retaining plate
90 Adjusting table

The invention claimed is:

1. A device for scanning a surface of a sample which is covered with a liquid, comprising:
    a probe which has a tip at one end;
    means for moving the probe and the sample relative to one another;
    a light source for generating light, the light being directed from the light source to an outside surface of the tip via a light path;
    a focusing device positioned in the light path which focuses the light from the light source onto a location in the direction of the outside surface of the tip located in the liquid; and
    a detector for detecting light scattered at least in part by the outside surface of the tip, wherein a boundary surface at which the light enters the liquid is located on the light path between the light source and the tip, wherein the boundary surface is positionally fixed with respect to the probe and the detector and the probe are positionally fixed relative to one another.

2. The device according to claim 1, wherein the light source and the probe are positionally fixed relative to one another.

3. The device according to claim 1, wherein a further boundary surface at which the light emerges from the liquid is located on the light path between the tip and the detector, the further boundary surface being positionally fixed with respect to the probe.

4. The device according to claim 1, wherein first deflecting means are provided which deflect the light emanating from the light source onto the tip.

5. The device according to claim 1, wherein a second deflecting means is provided which guides the light scattered by the tip onto the detector.

6. The device according to claim 5, wherein the second deflecting means and the probe are positionally fixed relative to one another.

7. The device according to claim 1, wherein a light-guiding device is provided, which is positionally fixed with respect to the probe,
    which is configured to be immersed at least partially into the liquid and
    which has an interior which is separated from the liquid by the boundary surface on the light path between the light source and the tip or by a further boundary surface on the light path between the tip and the detector or both.

8. The device according to claim 7, wherein one or more of the group consisting of the focussing device, a first deflecting means, a collimator device and a second deflecting means is fastened to the light-guiding device or formed in one piece therewith.

9. The device according to claim 7, wherein at least two of the light-guiding devices are provided, which are disposed relative to the probe in such a manner that one light-guiding device collects light transmitted by the tip and an other light-guiding device collects light reflected from the tip.

10. The device according to claim 7, wherein three of the light-guiding devices are provided, which are disposed relative to the probe in such a manner that one light-guiding device guides light from the light source to the tip, a second light-guiding device collects light transmitted by the tip and a third light-guiding device collects light reflected from the tip.

11. The device according to claim 1, wherein one or more of the focussing device, a first deflecting means, a collimator device and a second deflecting means forms the boundary surface on the light path between the light source and the tip or a further boundary surface on the light path between the tip and the detector.

12. The device according to claim 1, wherein the probe is detachably fastened in a probe holder by a resilient element which presses the probe against supports of the probe holder.

13. The device according to claim 12, wherein the probe holder has at least two individual supports each having a convex support surface.

14. The device according to claim 12, wherein the probe holder is detachably held on a retaining device.

15. The device according to claim 14, wherein the retaining device comprises a retaining plate and an adjusting device,
    wherein the probe holder is adjustable relative to the retaining plate by means of the adjusting device.

16. The device according to claim 1, wherein the probe is formed by a pipette which has said tip at one end,
    wherein an opening is located at the tip, via which an interior cavity of the pipette communicates with the external surroundings of the tip.

17. The device according to claim 16, wherein respectively an electrode is located in the liquid covering the sample and in the cavity of the pipette.

18. The device according to claim 1, wherein the light source is a laser.

19. The device according to claim 1, said device comprising means for generating vibrations of the tip, in particular a piezo-electric element.

20. The device according to claim 1, wherein the means for moving the probe and the sample relative to one another comprise a piezo-electric element.

21. The device according to claim 1, wherein a collimator device is provided which collimates the light scattered by the tip on the detector.

* * * * *